United States Patent
Hanna et al.

(10) Patent No.: US 7,113,371 B1
(45) Date of Patent: Sep. 26, 2006

(54) SUSPENSION DESIGN FOR ATTENUATION OF DISK FLUTTER INDUCED TRACK MIS-REGISTRATION OF A HARD DISK DRIVE BY MANIPULATION OF THE HINGE AND/OR LOAD BEAM

(75) Inventors: Aaron J. Hanna, San Jose, CA (US); Lin Yang, San Jose, CA (US); Jin Hui Ou-Yang, San Jose, CA (US); Chiao-Ping R. Ku, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 578 days.

(21) Appl. No.: 10/080,849

(22) Filed: Feb. 22, 2002

(51) Int. Cl.
*G11B 5/48* (2006.01)
*G11B 21/16* (2006.01)

(52) U.S. Cl. .................. 360/244.8; 360/244.2
(58) Field of Classification Search ............ 360/244.8, 360/244.4, 244.5, 244.2, 244.9, 245
See application file for complete search history.

(56) References Cited

U.S. PATENT DOCUMENTS

| | | | |
|---|---|---|---|
| 4,954,919 A | 9/1990 | Yamada | |
| 5,012,369 A * | 4/1991 | Owe et al. | 360/294.7 |
| 5,065,268 A * | 11/1991 | Hagen | 360/244.8 |
| 5,471,734 A * | 12/1995 | Hatch et al. | 29/603.03 |
| 5,661,619 A | 8/1997 | Gloss | |
| 5,734,525 A * | 3/1998 | Girard | 360/244.8 |
| 5,758,406 A | 6/1998 | Hunsaker et al. | |
| 5,790,347 A | 8/1998 | Girard | |
| 5,796,554 A * | 8/1998 | Berding et al. | 360/244.8 |
| 5,796,556 A * | 8/1998 | Boutaghou | 360/245.9 |
| 5,898,543 A * | 4/1999 | Jagt et al. | 360/244.8 |
| 5,907,457 A | 5/1999 | Kudo et al. | |
| 5,914,835 A * | 6/1999 | Girard et al. | 360/244.8 |
| 5,946,165 A | 8/1999 | Khan et al. | |
| 6,046,884 A * | 4/2000 | Crane | 360/244.2 |
| 6,181,521 B1 * | 1/2001 | Yonemura et al. | 360/244.8 |
| 6,359,758 B1 | 3/2002 | Boutaghou | |
| 6,362,936 B1 * | 3/2002 | Inoue et al. | 360/244.2 |
| 6,433,967 B1 * | 8/2002 | Arya | 360/244.8 |
| 6,721,133 B1 * | 4/2004 | Takagi et al. | 360/244.8 |
| 6,798,618 B1 * | 9/2004 | Takagi et al. | 360/244.5 |

* cited by examiner

*Primary Examiner*—Angel Castro
*Assistant Examiner*—Christopher R. Magee
(74) *Attorney, Agent, or Firm*—Alan W. Young, Esq.; Joshua C. Harrison, Esq.

(57) ABSTRACT

Disk drives including suspensions and head gimbal assemblies in which the load beam pitch angle is reduced exhibit a reduced disk flutter induced track mis-registration (TMR) at the disk outer diameter. The reduction in the load beam pitch angle may be achieved through variations in the load beam, hinge and/or mount plate configurations, relative positions and/or thickness.

44 Claims, 5 Drawing Sheets

SUSPENSION DESIGN FOR ATTENUATION OF DISK FLUTTER INDUCED TRACK MIS-REGISTRATION OF A HARD DISK DRIVE BY MANIPULATION OF THE HINGE AND/OR LOAD BEAM

BACKGROUND OF THE INVENTION

1. Field of the Invention

The present invention relates to disk drives. More particularly, the present invention relates to disk drives, head stack, gimbal and suspension assemblies that include structures that contribute to reducing disk flutter induced track mis-registration ("TMR").

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

A challenge faced by hard disk drive designers and manufacturers as they continually increase the capacities of contemporary hard disk drives is the phenomenon known as Non Repeatable Run Out ("NRRO"). NRRO, either written into the data tracks (usually denoted "RRO") or occurring live during drive operation, manifests itself as radial displacements of the read/write head(s) relative to the data tracks of the disk(s), caused by vibrations of either the HSA or disk pack (inc. spindle motor, disk(s), spacer(s), and clamp). As the storage capacity of magnetic disks increases, the number of data tracks per inch ("TPI") is increased, or conversely, the track width is decreased, leading to greater data density per unit area on the magnetic media. Since NRRO may degrade the data transfer performance to and from the magnetic media by increasing, for example, the frequency of off track errors, the ratio of RMS NRRO to track width must be maintained at a fairly constant value; thus, designers must ensure that NRRO decreases in proportion to track width. Since disk flutter (or out of plane vibrations of the disk induced by turbulent airflow within the drive) TMR is the dominant contributor to NRRO, reducing disk flutter TMR will correspondingly decrease NRRO. In turn, decreasing NRRO may enable higher TPI to be reliably achieved.

What are needed, therefore, disk drives, head stack and gimbal assemblies, suspensions and load beams configured to reduce disk flutter induced TMR.

SUMMARY OF THE INVENTION

This invention may be regarded as a head stack assembly for a disk drive having a disk, the head stack assembly including a body portion; an actuator arm cantilevered from the body portion; a hinge, a first surface of the hinge being coupled to the actuator arm; a load beam having a first end and a second end, the first end being attached to a second surface of the hinge, the second surface facing away from the first surface; a gimbal coupled to the second end of the load beam, and a slider coupled to the gimbal.

The present invention is also a disk drive, including a disk having a recording surface; a head stack assembly, including a body portion; an actuator arm cantilevered from the body portion; a hinge, a first surface of the hinge being coupled to the actuator arm; a load beam having a first end and a second end, the first end being attached to a second surface of the hinge, the second surface facing away from the first surface; a gimbal coupled to the second end of the load beam, and a slider coupled to the gimbal.

According to another embodiment thereof, the present invention is also a head gimbal assembly for a head stack assembly of a disk drive, the head stack assembly including a body portion, an actuator arm cantilevered from the body portion, the disk drive having a disk, including a hinge, a first surface of the hinge being coupled to the actuator arm; a load beam having a first end and a second end, the first end being attached to a second surface of the hinge, the second surface facing away from the first surface; a gimbal coupled to the second end of the load beam, and a slider coupled to the gimbal.

The present invention is also a suspension for a head stack assembly of a disk drive, the head stack assembly including an actuator arm and a mount plate. The suspension includes a hinge, a first surface of the hinge for coupling to the actuator arm; a load beam having a first end and a second end, the first end being attached to a second surface of the hinge, the second surface facing away from the first surface, and a gimbal coupled to the second end of the load beam.

The present invention may also be viewed as a suspension for a head stack assembly of a disk drive, the head stack assembly including a body portion, an actuator arm cantilevered from the body portion, the disk drive having a disk, including a load beam having a first end and a second end, the first end defining an integral hinge portion, the hinge portion defining a radius geometry that may include at least two radii of curvatures configured to lower load beam toward the disk, a first surface of the hinge portion being coupled to the actuator arm, and a gimbal coupled to the second end of the load beam.

The present invention, according to a still further embodiment thereof, is a head gimbal assembly for a head stack assembly of a disk drive, the head stack assembly including a body portion, an actuator arm cantilevered from the body portion, the disk drive having a disk, the head gimbal assembly including a load beam having a first end and a second end, the first end defining an integral hinge portion, the hinge portion defining a radius geometry that may include at least two radii of curvatures configured to lower load beam toward the disk, a first surface of the hinge portion being coupled to the actuator arm, and a gimbal coupled to the second end of the load beam, and a slider coupled to the gimbal.

Another embodiment of the present invention is a head stack assembly for a disk drive having a disk, the head stack assembly including a body portion; an actuator arm cantilevered from the body portion; a load beam having a first end and a second end, the first end defining an integral hinge portion, the hinge portion defining a radius geometry that may include at least two radii of curvatures configured to lower load beam toward the disk, a first surface of the hinge portion being coupled to the actuator arm; a gimbal coupled to the second end of the load beam, and a slider coupled to the gimbal.

The present invention may also be viewed as a disk drive, including a disk having a recording surface; a head stack assembly, including a body portion; an actuator arm cantilevered from the body portion; a load beam having a first end and a second end, the first end defining an integral hinge portion, the hinge portion defining a radius geometry that may include at least two radii of curvatures configured to lower load beam toward the disk, a first surface of the hinge portion being coupled to the actuator arm, and a gimbal coupled to the second end of the load beam, and a slider coupled to the gimbal.

According to another embodiment thereof the present invention is a head stack assembly for a disk drive having a disk, the head stack assembly including a body portion; an actuator arm cantilevered from the body portion; a hinge defining a radius geometry, the radius geometry including at least two radii of curvatures, the hinge being coupled to the actuator arm; a load beam having a first end and a second end, the first end being coupled to the hinge; a gimbal coupled to the second end of the load beam, and a slider coupled to the gimbal.

The invention is also a disk drive including a disk having a recording surface; a head stack assembly, including a body portion; an actuator arm cantilevered from the body portion; a hinge defining a radius geometry, the radius geometry including at least two radii of curvatures, the hinge being coupled to the actuator arm; a load beam having a first end and a second end, the first end being coupled to the hinge; a gimbal coupled to the second end of the load beam, and a slider coupled to the gimbal.

According to another embodiment, the present invention is a head gimbal assembly for a head stack assembly of a disk drive, the head stack assembly including a body portion, an actuator arm cantilevered from the body portion, the disk drive having a disk, the head gimbal assembly including a hinge defining a radius geometry, the radius geometry including at least two radii of curvatures, the hinge being coupled to the actuator arm; a load beam having a first end and a second end, the first end being coupled to the hinge; a gimbal coupled to the second end of the load beam, and a slider coupled to the gimbal.

The present invention is also a suspension for a head stack assembly of a disk drive, the head stack assembly including an actuator arm and a mount plate, the disk drive having a disk. The suspension includes a hinge defining a radius geometry, the radius geometry including at least two radii of curvatures, the hinge for coupling to the actuator arm; a load beam having a first end and a second end, the first end being coupled to the hinge, and a gimbal coupled to the second end of the load beam.

In the disk drives, head stack, gimbal and suspension assemblies according to the present invention, the radius geometry may include a first radius of curvature, a second radius of curvature and a third radius of curvature, the first radius being closer to the mount plate than the second radius, the second radius being closer to the mount plate than the third radius. The third radius may be greater than the second radius.

The disk drives and head stack assemblies may also include a mount plate attached to the actuator arm. The hinge may be coupled to the actuator arm via the mount plate, which mount plate may have a thickness that is greater than 0.22 mm. The hinge may have a thickness that is greater than 0.05 mm. The load beam may have a thickness that is greater than 0.12 mm.

The foregoing and other features of the invention are described in detail below and set forth in the appended claims.

DESCRIPTION OF THE PREFERRED EMBODIMENTS

Figure 7:
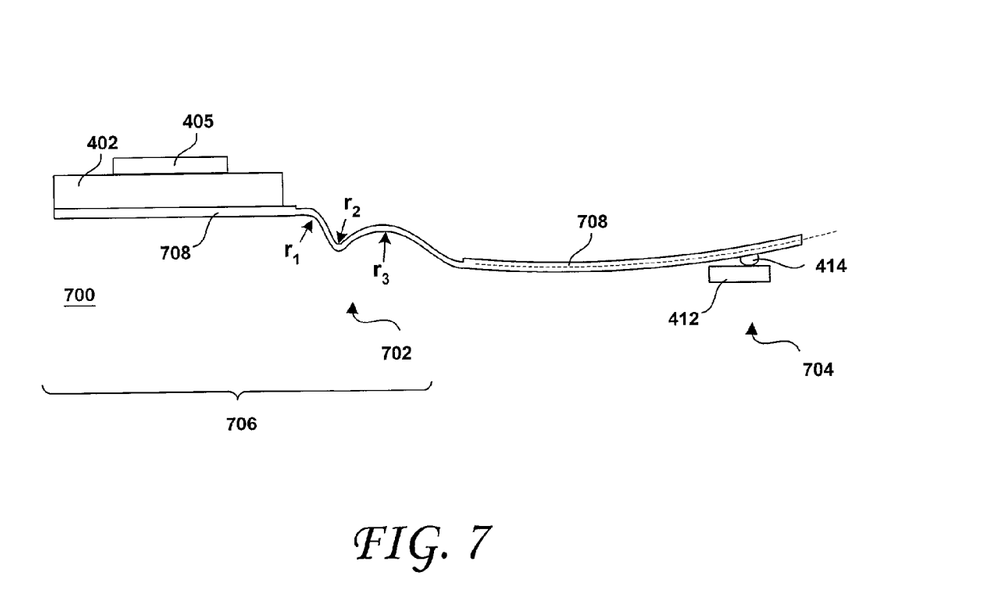
FIG. 7 shows a side view of a HGA, according to another embodiment of the present invention.
Figure 8:
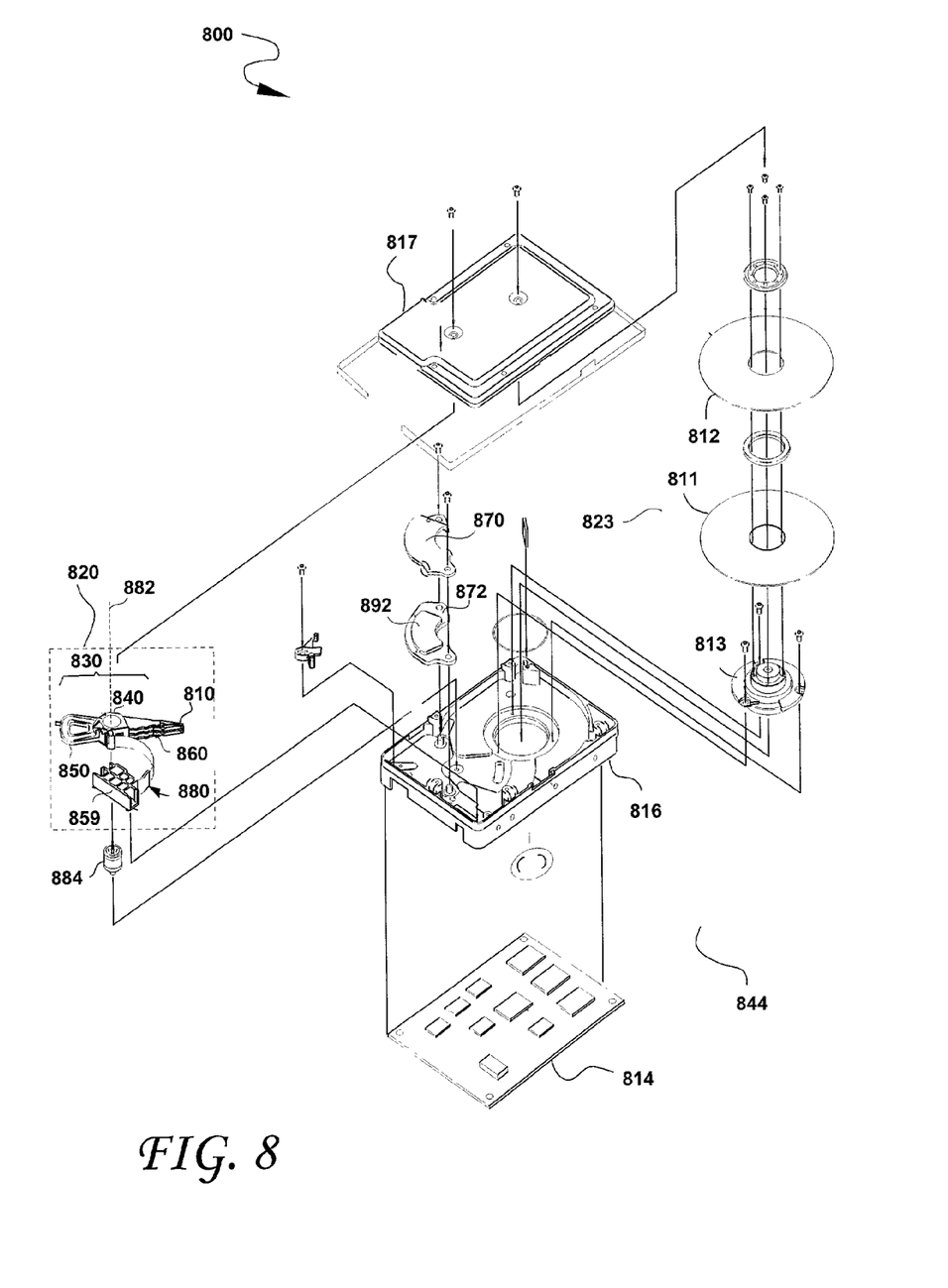
FIG. 8 is an exploded view of a hard disk drive, according to an embodiment of the present invention.

FIG. 8 shows the principal components of a magnetic disk drive 800 constructed in accordance with the present invention. With reference to FIG. 8, the disk drive 800 comprises a HDA 844 and a PCBA 814. The HDA 844 includes a base 816 and a cover 817 attached to the base 816 that collectively house a disk stack 823 that includes a plurality of magnetic disks (of which only a first disk 811 and a second disk 812 are shown), a spindle motor 813 attached to the base 816 for rotating the disk stack 823, an HSA 820, and a pivot bearing cartridge 884 (such as a stainless steel pivot bearing cartridge, for example) that rotatably supports the HSA 820 on the base 816. The spindle motor 813 rotates the disk stack 823 at a constant angular velocity. The HSA 820 comprises a swing-type or rotary actuator assembly 830, at least one HGA 810, and a flex circuit cable assembly 880. The rotary actuator assembly 830 includes a body portion 840, at least one actuator arm 860 cantilevered from the body portion 840, and a coil portion 850 cantilevered from the body portion 840 in an opposite direction from the actuator arm 860. The actuator arm 860 supports the HGA 810 that, in turn, supports the slider(s) (see FIGS. 4A, 4B, 5, 6 and 7) according to the present invention. The flex cable assembly 880 may include a flex circuit cable and a flex clamp 859. The HSA 820 is pivotally secured to the base 816 via the pivot-bearing cartridge 884 so that the slider at the distal end of the HGA 810 may be moved over the surfaces of the disks 811, 812. The pivot-bearing cartridge 884 enables the HSA 820 to pivot about a pivot axis, shown in FIGS. 8 and 3 at reference numeral 882. The storage capacity of the HDA 844 may be increased by, for example, increasing the track density (the TPI) on the disks 811, 812 and/or by including additional disks in the disk stack 823 and by an HSA 820 having a vertical stack of HGAs 810 supported by multiple actuator arms 860.

surface of/to the actuator arm, to the load beam. The pitch angle $\alpha_s$ is positive as shown in FIG. 2.

Figure 1:
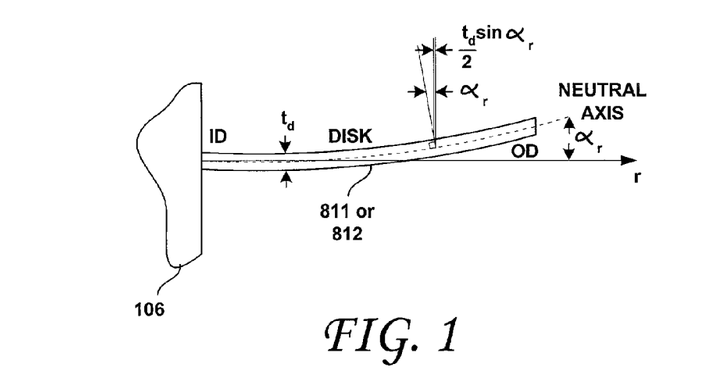
FIG. 1 depicts the geometry of a disk of a hard disk drive.
Figure 2:
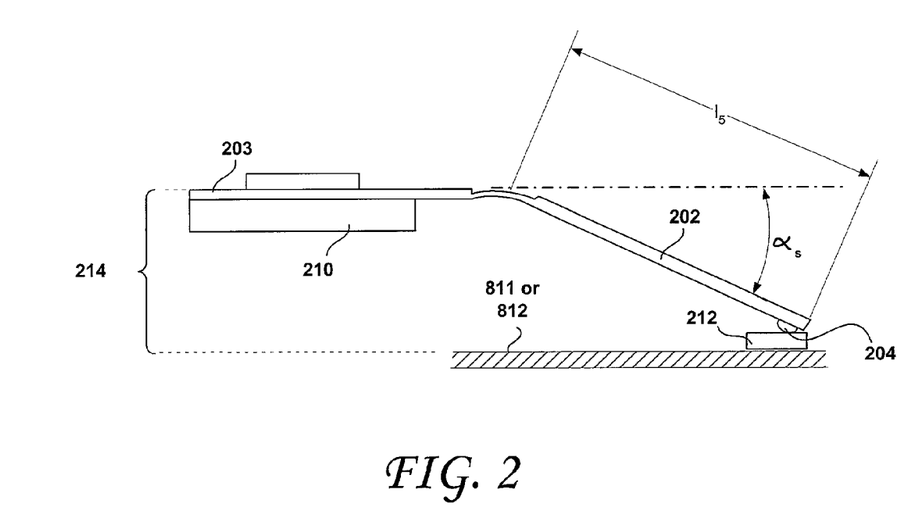
FIG. 2 shows a side view of a head gimbal assembly (HGA) in which the load beam pitch angle $\alpha_s$ is identified.
Figure 3:
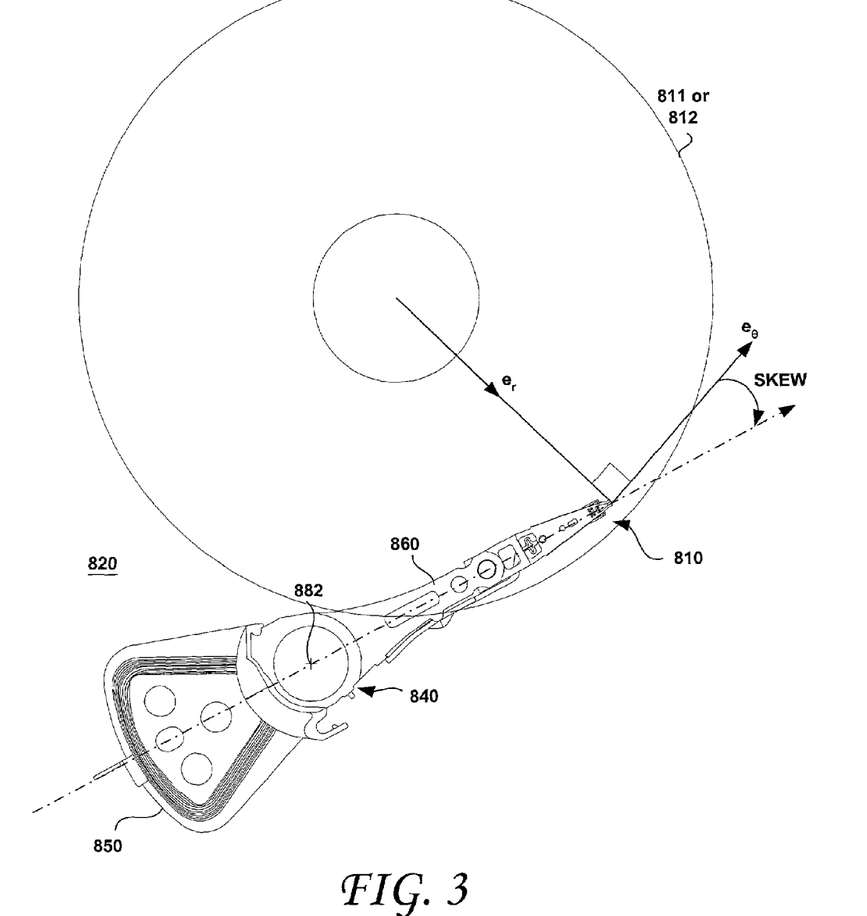
FIG. 3 is a plan view of a disk and a Head Stack Assembly (HSA) according to an embodiment of the present invention.

As shown in FIGS. 1 and 2 the disk and suspension TMR is modeled herein as $$TMR_{disk} = \frac{t_d}{2}\sin(\alpha_r) \tag{2}$$

and $$TMR_{suspension} = \sin(skew)l_5\left[\cos\left(\sin^{-1}\left(\frac{l_5\sin(\alpha_s)-z}{l_5}\right)\right) - \cos(\alpha_s)\right] \text{ (See Figs. 1, 2 and 3)} \tag{3}$$

The "rotary" or "swing-type" actuator assembly comprises a body portion 840 that rotates on the pivot bearing 884 cartridge between limited positions, a coil portion 850 that extends from one side of the body portion 840 to interact with one or more permanent magnets 892 mounted to back irons 870, 872 to form a voice coil motor (VCM), and an actuator arm 860 that extends from an opposite side of the body portion 840 to support the HGA 810. The VCM causes the HSA 820 to pivot about the actuator pivot axis 882 to cause the slider and the read write transducers thereof to sweep radially over the disk(s) 811, 812. The HGA 810 includes a load beam and a gimbal coupled to the load beam, as detailed below.

FIG. 3 is a plan view of a disk 811, 812 and a head stack assembly 820, according to an embodiment of the present invention. As shown therein, the skew angle is defined as the angle of the slider (best shown at 412 in FIGS. 4A, 4B, 5, 6 and 7) relative to a tangent to the data tracks recorded on the recording surface of the disk 811, 812. With reference to FIG. 3, the skew angle is shown as the angle formed between the longitudinal axis 310 of the head stack assembly 820 passing through the slider and the data track tangent 320. The data track tangent is parallel to the tangential direction $e_\theta$ that is at a 90-degree angle relative to the radial direction $e_r$. As defined herein and shown in FIG. 3, the skew angle is positive in the clockwise direction. The head stack assembly 820 of FIG. 3 may include one or more of the structures that are shown in FIGS. 4A, 4B, 5, 6 and 7 (and/or combinations and variants thereof) and that are described herein below.

Total disk flutter TMR, which is the radial position error between the read/write transducer heads and the data track of a hard disk drive due to disk vibrations, is the summation (in the time domain) of four components; namely, disk deformation, suspension pitching, and slider pitching and rolling. That is, $$TMR_{total} = TMR_{pitch} + TMR_{roll} + TMR_{disk} + TMR_{suspension} \tag{1}$$

FIG. 1 depicts the geometry of a disk 811 or 812 of a hard disk drive, such as shown at 800 in FIG. 8. The disk 811, 812 is clamped at the inner diameter (ID) thereof at clamp 106 and free at the outer diameter (OD) thereof. In FIG. 1, $\alpha_r$ is the angular orientation of the disk 811, 812 in the radial direction and $t_d$ is the thickness of the disk 811 or 812. As shown the disk 811 or 812 may undergo deformation, causing the neutral axis of the disk 811, 812 to deviate relative to the radial direction r by an angle $\alpha_r$.

FIG. 2 shows a side view of a HGA to illustrate the pitch angle $\alpha_s$. In FIG. 2, the pitch angle $\alpha_s$ is measured from the plane of the mount plate 210, or other suspension mounting where
z is the disk displacement from the undeformed state;
$l_5$ is the distance from the suspension RG (radius geometry) to the dimple (reference numeral 204 in FIG. 2);
$t_d$ is the thickness of the disk;
$\alpha_r$ is the angular orientation of the disk in the radial direction;
$\alpha_s$ is the pitch angle of the suspension load beam relative to the mount plate, and skew is the skew angle as shown in FIG. 3.

Restricting the r-dependence of z to monotonically increasing or decreasing, or zero-valued, functions (only modes of practical importance are considered, i.e. those with zero nodal circles) of r, then $$[\{s>0\} \Leftrightarrow \{\alpha_r>0\}, \{z=0\} \Leftrightarrow \{\alpha_r=0\}, \{z<0\} \Leftrightarrow \{\alpha_r<0\}], \tag{4}$$

for an arbitrary instant in time and angular location on the disk.

From Equation (2), it may be shown that minimizing $|\alpha_s|$ will minimize $TMR_{suspension}$ (regardless of skew angle), and therefore may reduce the total disk flutter induced TMR. Furthermore, if $\alpha_s<0$, it may be proven from equations (1)–(4) that $TMR_{suspension}$ and $TMR_{disk}$ are perfectly out-of-phase at negative skew angles (disk OD, where worst total disk flutter TMR typically occurs), and therefore at least partial cancellation of terms occurs, further reducing the total disk flutter TMR. Although there are four components that contribute to disk flutter TMR, only the suspension component is a function of $\alpha_s$; therefore, although the present invention only considers cancellation of disk and suspension TMR, the present invention may be extended to cover cancellation between the portions of slider pitch and roll TMR that are in-phase with disk TMR, i.e. the total disk flutter TMR may be considered solely as it varies with $\alpha_s$, without loss of generality.

The present invention includes a number of embodiments for mitigating the effects of disk flutter induced TMR. As collectively shown in FIGS. 8 and 4A, the present invention, according to one embodiment thereof, is a disk drive in which the HGA is configured such that the load beam is attached below the hinge, which is in turn placed below the mount plate (also called the swage plate), thereby lowering the mount plate end of the load beam and reducing the pitch angle $\alpha_s$ (including negative values). It may be shown that disk flutter TMR has a minimum for sufficiently negative values of $\alpha_s$, when the actuator is positioned to OD, although geometrical considerations may limit the range of $\alpha_s$. In particular, since only the suspension TMR is a function of $\alpha_s$, this minimum corresponds to complete cancellation by the suspension TMR of the portions of disk, slider pitch, and slider roll TMR that are 180° out-of-phase with respect to the suspension TMR.

Figure 4A:
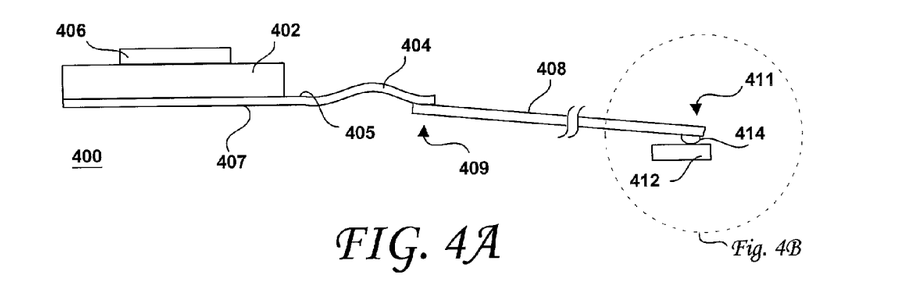
FIG. 4A shows a side view of a HGA, according to an embodiment of the present invention.
Figure 4B:
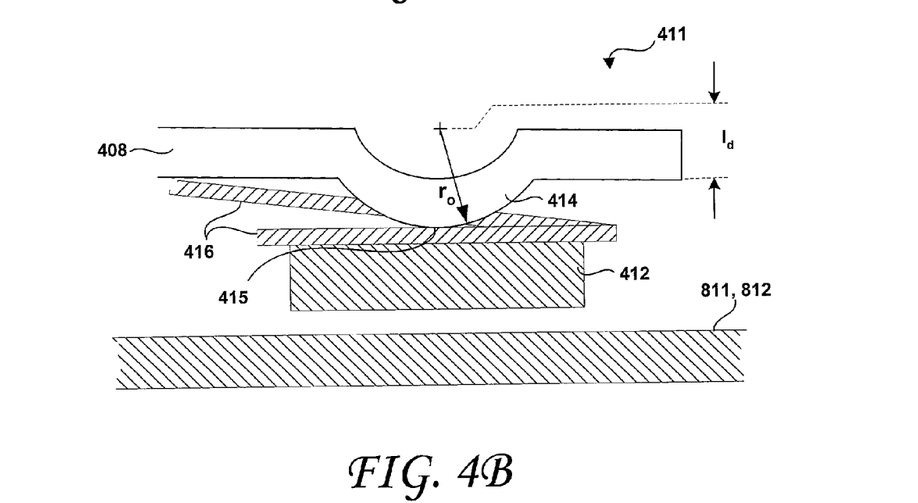
FIG. 4B is an enlarged view of a portion of FIG. 4B in conjunction with a disk.

More generally, the present invention is a disk drive 800 that includes a disk 811, 812 having a recording surface. A head stack assembly 820 includes a body portion 840 and an actuator arm 860 cantilevered from the body portion 840. With specific reference to FIG. 4A, the HGA 400 of the disk drive 800 includes a mount plate 402 attached to the actuator arm 860. The HGA 400 also includes a hinge 404 having a first surface 405 and a second surface 407 that faces away from the first surface 405. The first surface 405 of the hinge 404 is coupled to the mount plate 402, via swage boss 406 (for example). The load beam 408 of the HGA 400 defines a first end 409 and a second end 411. The first end 409 of the load beam 408 is attached to the second surface 407 of the hinge 404. As best shown in FIG. 4B, a gimbal 416 is coupled to the second end 411 of the load beam 408 and a slider 412 is coupled to the gimbal 416. FIG. 4B shows a dimple 414 formed within the load beam 408 near the second end 411 thereof, although the specific structure of the second end 411 of the load beam 408 shown in FIG. 4B is only exemplary and does not limit the scope of the present invention. Indeed, the second end 411 of the load beam 408 may include most any suitable structure for coupling the gimbal 416 and slider 412 thereto. For example, the structure shown and described in commonly assigned and co-pending U.S. patent application Ser. No. 10/080,786 filed on Feb. 22, 2002 and entitled "Suspension Design For Attenuation Of Disk Flutter Induced Track Mis-Registration Of A Hard Disk Drive By Manipulation Of The Load Beam Pitch Angle", the disclosure of which is incorporated herewith by reference may be advantageously incorporated into the disk drives, HSAs, HGAs and suspensions disclosed herein.

The effect of mounting the load beam 408 on the second surface 407 of the hinge 404 lowers the first end 409 of the hinge, which reduces the pitch angle $\alpha_s$. In turn, reducing $\alpha_s$ lowers the disk flutter TMR at the disk OD, as shown above. The TMR may be further lowered by manipulating the dimensions of the dimple 414 or of the feature at the second end 411 of the load beam 408 to which the gimbal 416 and the slider 412 are attached. Indeed, the disk flutter TMR at the disk OD may be also lowered by raising the second end 411 of the load beam 408, which also reduces the load beam pitch angle $\alpha_s$. For example, the dimple 414 may be formed with an extraordinarily large outer radius $r_o$ and/or extraordinarily small dimension $l_d$, such that the outer (spherical, for example) surface 415 of the dimple 414 extends extraordinarily low (i.e., toward the recording surface of the disk 811, 812), thereby raising the second end 411 of the load beam 408 and reducing the load beam pitch angle $\alpha_s$ and consequently the disk flutter induced TMR at the disk OD. The lowering of the first end 409 and/or the raising of the second end 411 thereof relative to the disk 811, 812 are subject to the available space between top of the hinge 203 in FIG. 2 and the disk 711, 712, among other constraints. This space is shown in FIG. 2 at reference numeral 214.

Figure 5:
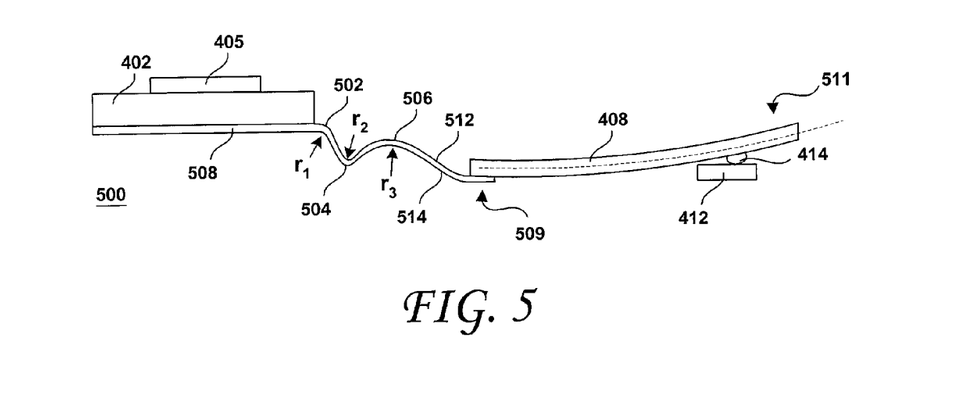
FIG. 5 shows a side view of a HGA, according to another embodiment of the present invention.

FIG. 5 shows a HGA 500 according to another embodiment of the present invention. This embodiment features a hinge 508 with a double or triple-formed radius geometry. In this embodiment, there are two primary radii of curvature: radius $r_2$ corresponds to a concave portion of the hinge 508, while $r_3$ corresponds to a convex portion of the hinge 508. Moreover, because $r_3 >> r_2$, for a given vertical force between the slider 412 and the disk, the angular deformation of the convex curve $r_3$ will be much greater than that of the concave curve $r_2$. This force is the gramload, which may be about 2.5 g, nominal. Variations in this force will be chiefly caused by vibrations of the disk, i.e. disk flutter. Thus, the concave curve $r_2$ acts to statically lower a first end 509 of the load beam 508, further reducing the load beam pitch angle $\alpha_s$ and the disk flutter induced TMR at the disk OD. Either the concave curve $r_2$ or convex curve $r_3$ may be located adjacent to the swage plate. Such a hinge 508 may constitute an etched portion of the load beam 408, or may be a separate component attached (e.g., welded) to the load beam 408 and the mount plate 502.

With reference to both FIGS. 5 and 8, a disk drive according to the present invention may include a disk 811, 812 having a recording surface; a head stack assembly 820 includes a body portion 840 and an actuator arm 860 cantilevered from the body portion 840. As shown in FIG. 5, the HGA 500 includes a mount plate 402 attached to the actuator arm 860 via swageboss 406; a load beam 408 having a first end 509 and a second end 511. A hinge 508 defines a radius geometry, the radius geometry including at least two radii of curvatures $r_2$ and $r_3$. The hinge 508 is coupled to the actuator arm, via the mount plate 402. The first end 509 of the load beam 402 is coupled to the hinge 508. Lastly, a gimbal (reference numeral 416 in FIG. 4B) is coupled to the second end 511 of the load beam 402 and a slider 412 (FIG. 4B) is coupled to the gimbal 416. As shown in FIG. 5, the hinge 508 may be separate from the load beam 402 and attached thereto.

The radius geometry of the hinge 508 may include three radii of curvature. A radius $r_1$ may be formed immediately adjacent the mount plate 402. Together, radii $r_1$ and $r_2$ act to lower the height of the center of curvature of the $r_3$ radius and, therefore, lower the first end 509 of the load beam 408 while allowing normal welding of the hinge 508 to the mount plate 402. The embodiment of the present invention shown in FIG. 5, therefore, includes a hinge 508 that has a first radius of curvature $r_1$, a second radius of curvature $r_2$ and a third radius of curvature $r_3$. The first radius $r_1$ is closer to the mount plate 402 than the second radius $r_2$ and the second radius $r_2$ is closer to the mount plate 402 than the third radius $r_3$. Preferably, the third radius $r_3$ is greater than the second radius $r_2$. Advantageously, by lowering the first end of the load beam 408 (thereby bringing it closer to the disk 811, 812), the load beam pitch angle $\alpha_s$ is reduced, along with the disk flutter induced TMR at the disk OD.

The load beam 408 in the HGA 500 of FIG. 5 is mounted on a first surface 512 of the hinge 508. However, to further lower the first end 509 of the load beam 408 relative to the disk 811, 812 to achieve a further reduction in the load beam pitch angle $\alpha_s$, the configuration of FIG. 6 may be employed. As shown therein, the load beam 408 of the HGA 600 is mounted on a second surface 514 of the hinge 508. This further reduces the load beam 408 and further contributes to lowering the load beam pitch angle $\alpha_s$.

Figure 6:
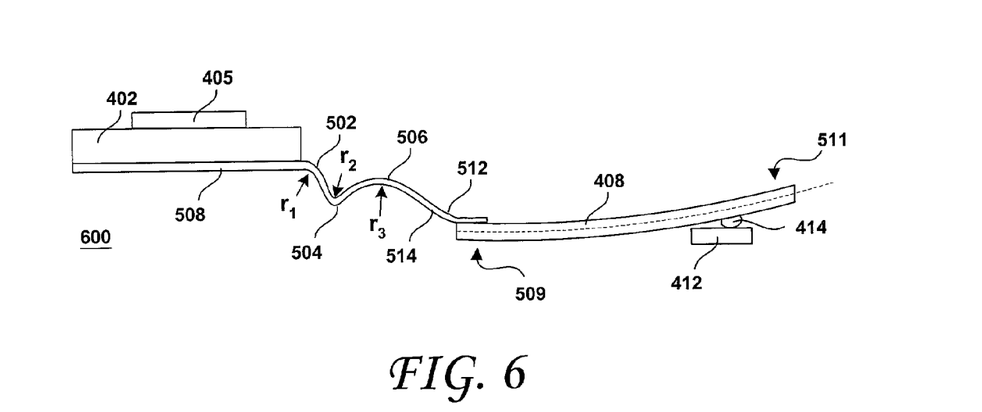
FIG. 6 shows a side view of a HGA, according to a still further embodiment of the present invention.

As shown in FIGS. 4A, 5 and 6, the hinge 508 may be a separate element from the load beam 408 and attached thereto. Alternatively, the hinge and the load beam may be formed as a single integral element. Indeed, as shown in FIG. 7, the HGA 700 includes a load beam 708 that has a first end 702 adjacent the mount plate 402 and a second end 704. The first end 702 defines an integral hinge portion 706. In turn, the hinge portion 706 defines a radius geometry that includes at least two radii of curvatures $r_2$ and $r_3$ that are together configured to lower load beam 708 toward the disk 811, 812. A first surface 710 of the hinge portion 706 is attached to the mount plate 402. The HGA 700 may also include the $r_1$ radius as detailed relative to FIG. 5.

Additional benefit, in terms of lowering the load beam pitch angle $\alpha_s$ to reduce the disk flutter induced TMR at the disk OD may be derived from appropriate selection of the thickness (as measured parallel to the axis 882) of the constituent elements of the HGAs shown in FIGS. 4A, 4B, 5, 6 and 7. Indeed, the thickness of the mount plate 402 may be selected to be greater than 0.22 mm. The thickness of the hinges 404 and 508, as well as the thickness of the hinge portion 706 may be selected to have a thickness that is greater than 0.05 mm. The thickness of the load beams 408 may also be selected to have a thickness that is greater than 0.12 mm.

The suspension, load beam, hinge features and configurations shown in FIGS. 4A, 5, 6 and 7 (and/or various combinations and variants thereof) may be incorporated in the HGA 810 of FIG. 8 to achieve head stacks and disk drives according to the present invention. Advantageously, the present invention, by reducing disk flutter induced TMR and consequently NRRO, enables the TPI of the disks 811, 812 to be increased, thereby enabling the capacity of the drive 800 to be correspondingly increased.

What is claimed is:

1. A head stack assembly for a disk drive having a disk, the head stack assembly comprising:
    a body portion;
    an actuator arm cantilevered from the body portion;
    a hinge, a first surface of the hinge being coupled to the actuator arm;
    a load beam having a first end and a second end, the first end including a load beam surface that faces and contacts a second surface of the hinge, the second surface facing away from the first surface;
    a gimbal coupled to the second end of the load beam, and
    a slider coupled to the gimbal;
    wherein the first surface includes
        a first convex portion defining a first radius of curvature, adjacent the actuator arm, and adjacent
        a first concave portion of the first surface, defining a second radius of curvature, adjacent,
        a second convex portion of the first surface, defining a third radius of curvature, adjacent
        a second concave portion of the first surface, adjacent the first end.

2. A disk drive, comprising:
    a disk having a recording surface;
    a head stack assembly, including;
        a body portion;
        an actuator arm cantilevered from the body portion;
        a hinge, a first surface of the hinge being coupled to the actuator arm;
        a load beam having a first end and a second end, the first end including a load beam surface that faces and contacts a second surface of the hinge, the second surface facing away from the first surface;
        a gimbal coupled to the second end of the load beam, and
        a slider coupled to the gimbal;
    wherein the first surface includes
        a first convex portion defining a first radius of curvature, adjacent the actuator arm, and adjacent
        a first concave portion of the first surface, defining a second radius of curvature, adjacent,
        a second convex portion of the first surface, defining a third radius of curvature, adjacent
        a second concave portion of the first surface, adjacent the first end.

3. The disk drive of claim 2, wherein the third radius is greater than the second radius.

4. A head gimbal assembly for a head stack assembly of a disk drive, comprising:
    a hinge having a first hinge surface and a second hinge surface;
    a mount plate coupled to the first hinge surface;
    a load beam having a first end and a second end, the first end including a load beam surface that faces and contacts the second hinge surface, the second hinge surface facing away from the first hinge surface;
    a gimbal coupled to the second end of the load beam, and
    a slider coupled to the gimbal;
    wherein the hinge includes a radius geometry that defines a first radius of curvature, a second radius of curvature and a third radius of curvature, the first radius being closer to the mount plate than the second radius, the second radius being closer to the mount plate than the third radius, and wherein the third radius is greater than the second radius.

5. A suspension for a head stack assembly of a disk drive, the suspension comprising:
    a hinge, having a first hinge end and a second hinge end;
    a mount plate coupled to the first hinge end;
    a load beam having a first load beam end and a second load beam end, the first load beam end being coupled to the second hinge end; and
    a gimbal coupled to the second load beam end;
    the hinge including a first surface having
        a first convex portion defining a first radius of curvature, adjacent the first hinge end, and adjacent
        a first concave portion of the first surface, defining a second radius of curvature, adjacent,
        a second convex portion of the first surface, defining a third radius of curvature, adjacent
        a second concave portion of the first surface, adjacent the second binge end.

6. The suspension of claim 5, wherein the hinge has a thickness that is greater than 0.05 mm.

7. The suspension of claim 5, wherein the load beam has a thickness that is greater than 0.12 mm.

8. The suspension of claim 5, wherein the third radius is greater than the second radius.

9. The suspension of claim 5, wherein the first surface is coupled to the mount plate.

10. The suspension of claim 9, wherein the hinge further comprises a second surface opposing the first surface and the second surface faces and is in contact with a surface of the load beam.

11. The suspension of claim 9, wherein the load beam has a thickness that is greater than 0.12 mm.

12. The suspension of claim 9, wherein the first radius is closer to the mount plate than the second radius, the second radius is closer to the mount plate than the third radius, and wherein the third radius is greater than the second radius.

13. A head gimbal assembly for a head stack assembly of a disk drive, the head stack assembly including a body portion, an actuator arm cantilevered from the body portion, the disk drive having a disk, the head gimbal assembly comprising:
    a load beam having a first end and a second end, the first end defining an integral hinge portion, the hinge portion defining a radius geometry that includes at least three radii of curvatures configured to lower load beam toward the disk such that a first surface of the hinge portion defines at least two concave portions and at least two convex portions, the first surface of the hinge portion being coupled to the actuator arm;
a gimbal coupled to the second end of the load beam, and a slider coupled to the gimbal.

14. The head gimbal assembly of claim 13, wherein the hinge portion has a thickness that is greater than 0.05 mm.

15. The head gimbal assembly of claim 13, wherein the load beam has a thickness that is greater than 0.12 mm.

16. The head gimbal assembly of claim 13, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

17. A head stack assembly for a disk drive having a disk, the head stack assembly comprising:
a body portion;
an actuator arm cantilevered from the body portion;
a load beam having a first end and a second end, the first end defining an integral hinge portion, the hinge portion defining a radius geometry that includes at least three radii of curvatures configured to lower load beam toward the disk such that a first surface of the hinge portion defines at least two concave portions and at least two convex portions, the first surface of the hinge portion being coupled to the actuator arm;
a gimbal coupled to the second end of the load beam, and a slider coupled to the gimbal.

18. The head stack assembly of claim 16, further including a mount plate attached to the actuator arm, the hinge portion being coupled to the actuator arm via the mount plate, the mount plate having a thickness that is greater than 0.22 mm.

19. The head stack assembly of claim 17, wherein the hinge portion has a thickness that is greater than 0.05 mm.

20. The head stack assembly of claim 17, wherein the load beam has a thickness that is greater than 0.12 mm.

21. The head stack assembly of claim 17, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

22. A disk drive, comprising;
a disk having a recording surface;
a head stack assembly, including:
a body portion;
an actuator arm cantilevered from the body portion;
a load beam having a first end and a second end, the first end defining an integral hinge portion, the hinge portion defining a radius geometry that includes at least three radii of curvatures configured to lower load beam toward the disk such that a first surface of the hinge portion defines at least two concave portions and at least two convex portions, the first surface of the hinge portion being coupled to the actuator arm;
a gimbal coupled to the second end of the load beam, and
a slider coupled to the gimbal.

23. The disk drive of claim 22, further including a mount plate attached to the actuator arm, the hinge portion being coupled to the actuator arm via the mount plate, the mount plate having a thickness that is greater than 0.22 mm.

24. The disk drive of claim 22, wherein the hinge portion has a thickness that is greater than 0.05 mm.

25. The disk drive of claim 22, wherein the load beam has a thickness that is greater than 0.12 mm.

26. The disk drive of claim 22, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

27. A head stack assembly for a disk drive having a disk, the head stack assembly comprising:
a body portion;
an actuator arm cantilevered from the body portion;
a hinge defining a radius geometry, the radius geometry including at least three radii of curvatures such that a first surface of the hinge defines at least two concave portions and at least two convex portions, the hinge being coupled to the actuator arm;
a load beam having a first end and a second end, the first end being coupled to the hinge;
a gimbal coupled to the second end of the load beam, and a slider coupled to the gimbal.

28. The head stack assembly of claim 27, further including a mount plate attached to the actuator arm, the hinge being coupled to the actuator arm via the mount plate, the mount plate having a thickness that is greater than 0.22 mm.

29. The bead stack assembly of claim 27, wherein the hinge further comprises a second surface opposing the first surface and the second surface faces and is in contact with a surface of the load beam.

30. The head stack assembly of claim 27, wherein the first surface faces and is in contact with a surface of the load beam.

31. The head stack assembly of claim 27, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

32. A disk drive, comprising:
a disk having a recording surface;
a head stack assembly, including:
a body portion;
an actuator arm cantilevered from the body portion;
a hinge defining a radius geometry, the radius geometry including at least three radii of curvatures such that a first surface of the hinge defines at least two concave portions and at least two convex portions, the hinge being coupled to the actuator arm;
a load beam having a first end and a second end, the first end being coupled to the hinge;
a gimbal coupled to the second end of the load beam, and
a slider coupled to the gimbal.

33. The disk drive of claim 32, further including a mount plate attached to the actuator arm, the hinge being coupled to the actuator arm via the mount plate, the mount plate having a thickness that is greater than 0.22 mm.

34. The disk drive of claim 32, wherein the hinge further comprises a second surface opposing the first surface and the second surface faces and is in contact with a surface of the load beam.

35. The disk drive of claim 32, wherein the first surface faces and is in contact with a surface of the load beam.

36. The disk drive of claim 32, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

37. A head gimbal assembly for a head stack assembly of a disk drive, the head stack assembly including a body portion, an actuator arm cantilevered from the body portion, the disk drive having a disk, the head gimbal assembly comprising:
    a hinge defining a radius geometry, the radius geometry including at least three radii of curvatures such that a first surface of the hinge defines at least two concave portions and at least two convex portions, the hinge being coupled to the actuator arm;
    a load beam having a first end and a second end, the first end being coupled to the hinge;
    a gimbal coupled to the second end of the load beam, and
    a slider coupled to the gimbal.

38. The head gimbal assembly of claim 37, wherein the hinge further comprises a second surface opposing the first surface and the second surface faces and is in contact with a surface of the load beam.

39. The head gimbal assembly of claim 37, wherein the first surface faces and is in contact with a surface of the load beam.

40. The head gimbal assembly of claim 37, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

41. A suspension for a head stack assembly of a disk drive, the suspension comprising:
    a hinge defining a radius geometry, the radius geometry including at least three radii of curvatures such that a first surface of the hinge defines at least two concave portions and at least two convex portions;
    a mount plate coupled to the first surface;
    a load beam having a first end and a second end, the first end being coupled to the hinge, and
    a gimbal coupled to the second end of the load beam.

42. The suspension of claim 41, wherein the hinge has a thickness that is greater than 0.05 mm.

43. The suspension of claim 41, wherein the load beam has a thickness that is greater than 0.12 mm.

44. The suspension of claim 41, wherein the radius geometry includes a first radius of curvature, a second radius of curvature and a third radius of curvature, the first radius being closer to the mount plate than the second radius, the second radius being closer to the mount plate than the third radius, and wherein the third radius is greater than the second radius.

* * * * *

UNITED STATES PATENT AND TRADEMARK OFFICE
CERTIFICATE OF CORRECTION

PATENT NO. : 7,113,371 B1
APPLICATION NO. : 10/080849
DATED : September 26, 2006
INVENTOR(S) : Aaron J. Hanna et al.

It is certified that error appears in the above-identified patent and that said Letters Patent is hereby corrected as shown below:

Col. 10, Line 37: After "second" delete "binge" and insert --hinge--.
(Claim 5, Line 17)

Col. 12, Line 29: After "The" delete "bead" and insert --head--.
(Claim 29, Line 1)

Signed and Sealed this

Tenth Day of June, 2008

JON W. DUDAS
*Director of the United States Patent and Trademark Office*